(12) United States Patent
Kamiya (10) Patent No.: US 10,669,458 B2
(45) Date of Patent: Jun. 2, 2020

(54) THERMOSETTING EPOXY RESIN COMPOSITION AND PRODUCTION METHOD FOR SAME

(71) Applicant: Dexerials Corporation, Shinagawa-ku, Tokyo (JP)

(72) Inventor: Kazunobu Kamiya, Tokyo (JP)

(73) Assignee: Dexerials Corporation, Shinagawa-ku, Tokyo (JP)

(*) Notice: Subject to any disclaimer, the term of this patent is extended or adjusted under 35 U.S.C. 154(b) by 0 days.

(21) Appl. No.: 16/302,831

(22) PCT Filed: Jun. 6, 2017

(86) PCT No.: PCT/JP2017/020906
§ 371 (c)(1),
(2) Date: Nov. 19, 2018

(87) PCT Pub. No.: WO2017/217276
PCT Pub. Date: Dec. 21, 2017

(65) Prior Publication Data
US 2019/0203087 A1    Jul. 4, 2019

(30) Foreign Application Priority Data
Jun. 15, 2016   (JP) ................... 2016-119057

(51) Int. Cl.
| | | |
|---|---|---|
| *C09J 163/00* | (2006.01) | |
| *C09J 11/08* | (2006.01) | |
| *C09J 5/06* | (2006.01) | |
| *C08G 18/76* | (2006.01) | |
| *C08G 18/00* | (2006.01) | |
| *C08G 59/40* | (2006.01) | |
| *C08G 18/08* | (2006.01) | |
| *C08G 59/70* | (2006.01) | |
| *C08G 18/28* | (2006.01) | |
| *C08K 5/057* | (2006.01) | |
| *C08G 18/80* | (2006.01) | |
| *C08K 3/38* | (2006.01) | |
| *C08G 18/70* | (2006.01) | |
| *C08K 5/54* | (2006.01) | |
| *C09J 11/06* | (2006.01) | |

(52) U.S. Cl.
CPC .......... *C09J 163/00* (2013.01); *C08G 18/003* (2013.01); *C08G 18/0866* (2013.01); *C08G 18/289* (2013.01); *C08G 18/707* (2013.01); *C08G 18/7671* (2013.01); *C08G 18/8029* (2013.01); *C08G 59/4021* (2013.01); *C08G 59/70* (2013.01); *C08K 3/38* (2013.01); *C08K 5/057* (2013.01); *C08K 5/54* (2013.01); *C09J 5/06* (2013.01); *C09J 11/06* (2013.01); *C09J 11/08* (2013.01); *C09J 2463/00* (2013.01); *C09J 2475/00* (2013.01)

(58) Field of Classification Search
CPC ......... C08G 18/003; C08G 59/70; C08K 3/38
See application file for complete search history.

(56) References Cited

U.S. PATENT DOCUMENTS

| | | | | |
|---|---|---|---|---|
| 5,314,720 A | * | 5/1994 | Gan | ............... C08G 59/18 427/386 |
| 10,093,769 B2 | | 10/2018 | Kamiya | |
| 2007/0010636 A1 | | 1/2007 | Kamiya et al. | |
| 2009/0230360 A1 | | 9/2009 | Komuro et al. | |
| 2010/0249338 A1 | | 9/2010 | Kamiya | |
| 2010/0324170 A1 | | 12/2010 | Kamiya | |
| 2012/0119156 A1 | | 5/2012 | Kamiya | |

FOREIGN PATENT DOCUMENTS

| | | |
|---|---|---|
| JP | 63-189472 | 8/1988 |
| JP | 2005-330405 | 12/2005 |
| JP | 2006-070051 | 3/2006 |
| JP | 2009-051960 | 3/2009 |
| JP | 2009-221465 | 10/2009 |
| JP | 2009221465 A  * | 10/2009 |
| JP | 2012-188596 | 10/2012 |
| JP | 2014-015631 | 1/2014 |
| JP | 5458596 | 1/2014 |
| JP | 5707662 | 3/2015 |
| JP | 2016-056274 | 4/2016 |
| WO | 2007/091358 | 8/2007 |
| WO | 2008/090792 | 7/2008 |
| WO | 2012/002177 | 1/2012 |
| WO | 2013/005471 | 1/2013 |

OTHER PUBLICATIONS

Machine translation of JP-2009221465-A (Year: 2009).*
CEL2021P (Year: 2019).*
Japanese Patent Office, Office Action issued in corresponding Japanese Application No. 2016-119057, dated Oct. 29, 2019.

* cited by examiner

*Primary Examiner* — Wenwen Cai
(74) *Attorney, Agent, or Firm* — Carmody Torrance Sandak & Hennessey LLP (57) ABSTRACT

Provided is a thermosetting epoxy resin composition, including: an epoxy resin; a latent curing agent which is porous particles formed of a polyurea resin and supporting an aluminum chelate; and boric acid.

8 Claims, 2 Drawing Sheets

THERMOSETTING EPOXY RESIN COMPOSITION AND PRODUCTION METHOD FOR SAME

TECHNICAL FIELD

The present invention relates to a thermosetting epoxy resin composition and a method for producing the same.

BACKGROUND ART

Hitherto, as curing agents that exhibit a low-temperature fast-curing activity with respect to epoxy resins, there have been proposed aluminum chelate-based latent curing agents in which porous resins obtained by interfacial polymerization of multifunctional isocyanate compounds support aluminum chelate-based curing agents (for example, see PTLs 1 and 2).

When aryl silanol is used in combination in thermosetting epoxy resin composition using such latent curing agents, the aluminum chelate and aryl silanol work in cooperation with each other to allow the epoxy resin to be cationically cured.

With a view to, for example, imparting weather resistance to thermosetting epoxy resin compositions or forming relatively thickly coatable coating films of thermosetting epoxy resin compositions, there has been proposed a technique of blending an aluminum chelate, alkyl phenyl polysiloxane, and an alkoxy boron compound (for example, see PTL 3).

In recent years, thermosetting epoxy resin compositions using latent curing agents have been required to have a greater low-temperature curability. However, an attempt to improve low-temperature curability typically causes a problem of increasing the likelihood of viscosity rise during storage.

CITATION LIST

Patent Literature

PTL 1: Japanese Patent (JP-B) No. 5458596
PTL 2: JP-B No. 5707662
PTL 3: Japanese Patent Application Laid-Open (JP-A) No. 63-189472

SUMMARY OF INVENTION

Technical Problem

The present invention aims for solving the various problems in the related art and achieving an object described below. That is, the present invention has an object to provide a thermosetting epoxy resin composition that can be improved in low-temperature curability without adverse influence on viscosity rise during storage, and a method for producing the same.

Solution to Problem

Means for solving the above problems are as follows.
<1> A thermosetting epoxy resin composition, including:
an epoxy resin;
a latent curing agent which is porous particles formed of a polyurea resin and supporting an aluminum chelate; and
boric acid.
<2> The thermosetting epoxy resin composition according to <1>, further including: an organosilane compound.
<3> The thermosetting epoxy resin composition according to <2>,
wherein the organosilane compound contains at least any one of an aryl silanol compound and a silane coupling agent.
<4> The thermosetting epoxy resin composition according to <2> or <3>,
wherein the boric acid is derived from a boric acid ester during preparation of the thermosetting epoxy resin composition; and
wherein a ratio by mass (organosilane compound:boric acid ester) between a blending amount of the organosilane compound and a blending amount of the boric acid ester during preparation of the thermosetting epoxy resin composition is from 1:3 through 3:1.
<5> The thermosetting epoxy resin composition according to any one of <1> to <4>,
wherein the epoxy resin contains an alicyclic epoxy resin.
<6> The thermosetting epoxy resin composition according to <5>,
wherein the alicyclic epoxy resin contains at least any one of compounds represented by structural formulae below, <7> The thermosetting epoxy resin composition according to any one of <1> to <6>,
wherein the porous particles further contain a vinyl resin as a constituent component.
<8> The thermosetting epoxy resin composition according to any one of <1> to <7>,
wherein a surface of the porous particles contains a reaction product of an alkoxysilane coupling agent.
<9> A method for producing the thermosetting epoxy resin composition according to any one of <1> to <8>, the method including:
a mixing step of mixing the epoxy resin, the latent curing agent, and the boric acid ester.
<10> The method for producing the thermosetting epoxy resin composition according to <9>,
wherein the mixing step further mixes the organosilane compound.
<11> The method for producing the thermosetting epoxy resin composition according to <10>,
wherein a ratio by mass (organosilane compound:boric acid ester) between the organosilane compound and the boric acid ester in the mixing step is from 1:3 through 3:1.

Advantageous Effects of Invention

The present invention can solve the various problems in the related art, achieve the object described above, and provide a thermosetting epoxy resin composition that can be improved in low-temperature curability without adverse influence on viscosity rise during storage, and a method for producing the same.

DESCRIPTION OF EMBODIMENTS (Thermosetting Epoxy Resin Composition)

A thermosetting epoxy resin composition of the present invention contains at least an epoxy resin, a latent curing agent, and boric acid, preferably contains an organosilane compound, and further contains other components as needed.

The present inventor has conducted earnest studies in order to provide a thermosetting epoxy resin composition that can be improved in low-temperature curability without adverse influence on viscosity rise during storage. As a result, the present inventor has reached the completion of the present invention, finding that combined use of an organosilane compound with boric acid instead of use of an organosilane compound in a thermosetting epoxy resin composition containing an epoxy resin and a latent curing agent can improve low-temperature curability without adverse influence on viscosity rise during storage.

JP-A No. 63-189472 mentioned above proposes a technique of blending an aluminum chelate, alkyl phenyl polysiloxane, and an alkoxy boron compound in a thermosetting epoxy resin composition, but suggests nothing about whether it is possible to improve low-temperature curability without adverse influence on viscosity rise during storage.

<Epoxy Resin>

The epoxy resin is not particularly limited and may be appropriately selected depending on the intended purpose. Examples of the epoxy resin include glycidyl ether-type epoxy resin and an alicyclic epoxy resin.

For example, the glycidyl ether-type epoxy resin may be liquid or solid, and typically has an epoxy equivalent of about from 100 through 4,000. A glycidyl ether-type epoxy resin that contains two or more epoxy groups in a molecule is preferable. Examples of such a glycidyl ether-type epoxy resin include a bisphenol A-type epoxy resin, a bisphenol F-type epoxy resin, a phenol novolac-type epoxy resin, a cresol novolac-type epoxy resin, and an ester-type epoxy resin. Among these glycidyl ether-type epoxy resins, a bisphenol A-type epoxy resin can be suitably used in terms of resin properties. These epoxy resins encompass monomers and oligomers.

The alicyclic epoxy resin is not particularly limited and may be appropriately selected depending on the intended purpose. Examples of the alicyclic epoxy resin include vinyl cyclopentadiene dioxide, vinyl cyclohexene mono- or di-oxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro [5.5] undecan-3-yl]-cyclohexane), 3,4-epoxycyclohexylmethyl-3',4'-epoxycyclohexane carborate, epoxy $C_{5-12}$ cycloalkyl $C_{1-3}$ alkyl-epoxy $C_{5-12}$ cycloalkane carboxylate (e.g., 4,5-epoxycyclooctylmethyl-4',5'-epoxycyclooctane carboxylate), and bis($C_{1-3}$ alkylepoxy $C_{5-12}$ cycloalkyl $C_{1-3}$ alkyl)dicarboxylate (e.g., bis(2-methyl-3,4-epoxycyclohexylmethyl)adipate).

As the alicyclic epoxy resin, 3,4-epoxycyclohexylmethyl-3',4'-epoxycyclohexane carboxylate is suitable for use in terms of ease of procurement as a commercially available product [available from Daicel Corporation, product name: CELLOXIDE #2021P; with an epoxy equivalent of from 128 through 140].

In the examples raised above, the descriptions $C_{8-15}$, $C_{5-12}$, and $C_{1-3}$ stand for a number of carbon atoms of from 8 through 15, a number of carbon atoms of from 5 through 12, and a number of carbon atoms of from 1 through 3, respectively, and suggest structural variations of the compounds.

The structural formula of an example of the alicyclic epoxy resin is presented below.

The content of the epoxy resin in the thermosetting epoxy resin composition is not particularly limited, may be appropriately selected depending on the intended purpose, and is preferably from 30% by mass through 99% by mass, more preferably from 50% by mass through 98% by mass, and particularly preferably from 70% by mass through 97% by mass.

In the present specification, the numerical range defined using the term "through" is a range including the lower limit value and the upper limit value. That is, "from 30% by mass through 99% by mass" has the same meaning as "30% by mass or greater but 99% by mass or less".

<Latent Curing Agent>

The latent curing agent is porous particles.

The porous particles are formed of at least a polyurea resin, and may further contain a vinyl resin as a constituent component.

The porous particles support at least an aluminum chelate.

For example, the porous particles support the aluminum chelate in the pores thereof. In other words, the aluminum chelate is supported by being taken into the fine pores present in the porous particle matrix formed of the polyurea resin.

It is preferable that the surface of the porous particles contain a reaction product of an alkoxysilane coupling agent.

<<Polyurea Resin>>

The polyurea resin is a resin that contains a urea bond in the resin.

The polyurea resin constituting the porous particles is obtained by, for example, polymerizing a multifunctional isocyanate compound in an emulsified liquid. The details will be described below. The polyurea resin may contain a bond that is derived from an isocyanate group and is other than a urea bond, such as a urethane bond in the resin.

<<Vinyl Resin>>

The vinyl resin is a resin obtained by polymerizing a radical polymerizable vinyl compound.

The vinyl resin improves the mechanical properties of the porous particles. This can realize thermal responsiveness of an epoxy resin in a thermosetting epoxy resin composition during curing, particularly, a sharp thermal responsiveness in a low-temperature region.

The vinyl resin can be obtained by, for example, making the radical polymerizable vinyl compound co-present in the emulsified liquid containing the multifunctional isocyanate compound, and radical-polymerizing the radical polymerizable vinyl compound at the same time as polymerizing the multifunctional isocyanate compound in the emulsified liquid.

<<Aluminum Chelate>>

Examples of the aluminum chelate include a complex compound that is represented by general formula (1) below and in which three β-ketoenolate anions are coordinated to aluminum. Here, alkoxy groups are not directly bonded to aluminum. If they are directly bonded, they tend to be hydrolyzed, which is not suitable for emulsification during production of the porous particles.

General formula (1)

In general formula (1), $R^1$, $R^2$ and $R^3$ each independently represent an alkyl group or an alkoxyl group.

Examples of the alkyl group include a methyl group and an ethyl group.

Examples of the alkoxyl group include a methoxy group, an ethoxy group, and an oleyloxy group.

Examples of the complex compound represented by general formula (1) include aluminum tris(acetyl acetonate), aluminum tris(ethyl acetoacetate), aluminum monoacetyl acetonate bis(ethyl acetoacetate), and aluminum monoacetyl acetonate bis(oleyl acetoacetate).

The content of the aluminum chelate in the porous particles is not particularly limited and may be appropriately selected depending on the intended purpose.

The average pore diameter of the pores of the porous particles is not particularly limited, may be appropriately selected depending on the intended purpose, and is preferably from 1 nm through 300 nm and more preferably from 5 nm through 150 nm.

<Reaction Product>

The reaction product is obtained from reaction of an alkoxysilane coupling agent.

The reaction product is present on the surface of the porous particles.

It is preferable that the reaction product be obtained from a deactivating step to be described in detail below.

It is preferable that the latent curing agent be in the form of particles.

The average particle diameter of the latent curing agent is not particularly limited, may be appropriately selected depending on the intended purpose, and is preferably from 0.5 micrometers through 20 micrometers, more preferably from 1 micrometer through 10 micrometers, and particularly preferably from 1 micrometer through 5 micrometers.

The content of the latent curing agent in the thermosetting epoxy resin composition is not particularly limited, may be appropriately selected depending on the intended purpose, and is preferably from 1 part by mass through 70 parts by mass and more preferably from 1 part by mass through 50 parts by mass relative to 100 parts by mass of the epoxy resin. When the content of the latent curing agent is less than 1 part by mass, curability may be poor. When the content of the latent curing agent is greater than 70 parts by mass, resin properties (e.g., flexibility) of a cured product may be poor.

<<Method for Producing Latent Curing Agent>>

For example, a method for producing the latent curing agent includes at least a porous particle producing step and a deactivating step, and further includes other steps as needed.

—Porous Particle Producing Step—

The porous particle producing step includes at least an emulsified liquid producing process and a polymerization process, preferably includes an additionally filling process, and further includes other processes as needed.

——Emulsified Liquid Producing Process——

The emulsified liquid producing process is not particularly limited and may be appropriately selected and may be appropriately selected depending on the intended purpose so long as the emulsified liquid producing process is a process of emulsifying a to liquid in which an aluminum chelate, a multifunctional isocyanate compound, and preferably an organic solvent are mixed, to obtain an emulsified liquid. The emulsified liquid producing process can be performed with, for example, a homogenizer.

When there are not only a polyurea resin but also a vinyl resin as the resins for constituting the porous particles, the liquid further contains a radical polymerizable vinyl compound and a radical polymerization initiator.

Examples of the aluminum chelate include the aluminum chelate mentioned in the description about the latent curing agent of the present invention.

The size of oil droplets in the emulsified liquid is not particularly limited, may be appropriately selected depending on the intended purpose, and is preferably from 0.5 micrometers through 100 micrometers.

——Multifunctional Isocyanate Compound——

The multifunctional isocyanate compound is a compound that contains two or more isocyanate groups, preferably three isocyanate groups in a molecule. More preferable examples of such a trifunctional isocyanate compound include a TMP adduct form represented by general formula (2) below and obtained by allowing 1 mole of trimethylolpropane and 3 moles of a diisocyanate compound to undergo reaction, an isocyanurate form represented by general formula (3) below and obtained by allowing 3 moles of a diisocyanate compound to undergo self-condensation, and a biuret form represented by general formula (4) below and obtained as a result of diisocyanate urea obtained from 2 moles out of 3 moles of a diisocyanate compound undergoing condensation with the remaining 1 mole of diisocyanate.

General formula (2)

General formula (3)

General formula (4)

In general formulae (2) to (4), a substituent R is a moiety of the diisocyanate compound excluding an isocyanate group. Specific examples of such a diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylene diphenyl-4,4'-diisocyanate.

The blending ratio between the aluminum chelate and the multifunctional isocyanate compound is not particularly limited and may be appropriately selected depending on the intended purpose. When the blending amount of the aluminum chelate is extremely low, a curing ability for an epoxy resin to be cured is low. When the blending amount of the aluminum chelate is extremely high, the latency of the latent curing agent to be obtained is low. In these regards, the ratio of the aluminum chelate with respect to 100 parts by mass of the multifunctional isocyanate compound is preferably from 10 parts by mass through 500 parts by mass and more preferably from parts by mass through 300 parts by mass.

———Organic Solvent———

The organic solvent is not particularly limited and may be appropriately selected depending on the intended purpose. A volatile organic solvent is preferable.

It is preferable that the organic solvent be a good solvent for each of the aluminum chelate, the multifunctional isocyanate compound, the multifunctional radical polymerizable vinyl compound, and the radical polymerization initiator (each having a solubility of preferably 0.1 g/ml (organic solvent) or greater), be substantially insoluble to water (water having a solubility of 0.5 g/ml (organic solvent) or less), and have a boiling point of 100 degrees C. or lower at the atmospheric pressure. Specific examples of such a volatile organic solvent include alcohols, acetic acid esters, and ketones. Among these volatile organic solvents, ethyl acetate is preferable in terms of a high polarity, a low boiling point, and a poor water-solubility.

The amount of the organic solvent to be used is not particularly limited and may be appropriately selected depending on the intended purpose.

———Radical Polymerizable Vinyl Compound———

The radical polymerizable vinyl compound is a compound that contains a radical polymerizable carbon-carbon unsaturated bond in a molecule.

The radical polymerizable vinyl compound encompasses a so-called monofunctional radical polymerizable compound and a multifunctional radical polymerizable compound.

It is preferable that the radical polymerizable vinyl compound contain a multifunctional radical polymerizable compound. This is because use of a multifunctional radical polymerizable compound makes it easier to realize a sharp thermal responsiveness in a low-temperature region. Also in this regard, it is preferable that the radical polymerizable vinyl compound contain a multifunctional radical polymerizable compound in an amount of 30% by mass or greater and more preferably 50% by mass or greater.

Examples of the monofunctional radical polymerizable compound include a monofunctional vinyl-based compound (e.g., styrene and methyl styrene) and a monofunctional (meth)acrylate-based compound (e.g., butyl acrylate).

Examples of the multifunctional radical polymerizable compound include a multifunctional vinyl-based compound (e.g., divinyl benzene and divinyl adipate) and a multifunctional (meth)acrylate-based compound (e.g., 1,6-hexanediol diacrylate and trimethylolpropane triacrylate).

Among these radical polymerizable vinyl compounds, a multifunctional vinyl-based compound, particularly, divinyl benzene can be suitably used in terms of latency and thermal responsiveness.

The multifunctional radical polymerizable compound may be formed of a multifunctional vinyl-based compound and a multifunctional (meth)acrylate-based compound. Such a combined use makes it possible to obtain an effect of varying thermal responsiveness or introducing a reactive functional group.

The blending amount of the radical polymerizable vinyl compound is not particularly limited, may be appropriately selected depending on the intended purpose, and is preferably from 1 part by mass through 80 parts by mass and more preferably from 10 parts by mass through 60 parts by mass relative to 100 parts by mass of the multifunctional isocyanate compound.

———Radical Polymerization Initiator———

Examples of the radical polymerization initiator include a peroxide-based initiator and an azo-based initiator.

The blending amount of the radical polymerization initiator is not particularly limited, may be appropriately selected depending on the intended purpose, and is preferably from 0.1 parts by mass through 10 parts by mass and more preferably from 0.5 parts by mass through 5 parts by mass relative to 100 parts by mass of the radical polymerizable vinyl compound.

———Polymerization Process———

The polymerization process is not particularly limited and may be appropriately selected depending on the intended purpose so long as the polymerization process is a process of polymerizing the multifunctional isocyanate compound in the emulsified liquid to obtain porous particles.

The porous particles support the aluminum chelate.

In the polymerization process, some isocyanate groups of the multifunctional isocyanate compound are hydrolyzed to amino groups, and these amino groups react with isocyanate groups of the multifunctional isocyanate compound to produce urea bonds, to obtain a polyurea resin. Here, when the multifunctional isocyanate compound contains a urethane bond, the polyurea resin to be obtained also contains a urethane bond. In this regard, the polyurea resin to be produced can also be referred to as polyurea urethane resin.

When the emulsified liquid contains the radical polymerizable vinyl compound and the radical polymerization initiator, in the polymerization process, the radical polymerizable vinyl compound undergoes radical polymerization in the presence of the radical polymerization initiator at the same time as the multifunctional isocyanate compound is polymerized.

As a result, the porous particles to be obtained contain a polyurea resin and a vinyl resin as the constituent resins.

The polymerization time in the polymerization process is not particularly limited, may be appropriately selected depending on the intended purpose, and is preferably from 1 hour through 30 hours and more preferably from 2 hours through 10 hours.

The polymerization temperature in the polymerization process is not particularly limited, may be appropriately selected depending on the intended purpose, and is preferably from 30 degrees C. through 90 degrees C. and more preferably from 50 degrees C. through 80 degrees C.

——Additionally Filling Process——

The additionally filling process is not particularly limited and may be appropriately selected depending on the intended purpose so long as the additionally filling process is a process of additionally filling an aluminum chelate to the porous particles obtained through the polymerization process. Examples of the method for the additionally filling process include a method of immersing the porous particles in a solution obtained by dissolving an aluminum chelate in an organic solvent and subsequently removing the organic solvent from the solution.

Through the additionally filling process, the amount of aluminum chelate to be supported on the porous particles increases. The porous particles to which an aluminum chelate is additionally filled may be filtrated, washed, and dried as needed, and subsequently pulverized to primary particles with a known pulverizer.

The aluminum chelate to be additionally filled in the additionally filling process may be the same as or different from the aluminum chelate blended in the liquid, which is to become the emulsified liquid. For example, because no water is used in the additionally filling process, the aluminum chelate used in the additionally filling process may be an aluminum chelate in which alkoxy groups are bonded to aluminum. Examples of such an aluminum chelate include diisopropoxyaluminum monooleyl acetoacetate, monoisopropoxyaluminum bis(oleyl acetoacetate), monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, and monoisopropoxyaluminum mono-N-lauroyl-β-alanate monolauryl acetoacetate.

The organic solvent is not particularly limited and may be appropriately selected depending on the intended purpose. Examples of the organic solvent include the organic solvents raised as examples in the description about the emulsified liquid producing process. A preferable mode is also the same.

The method for removing the organic solvent from the solution is not particularly limited and may be appropriately selected depending on the intended purpose. Examples of the method include a method of heating the solution to higher than or equal to the boiling point of the organic solvent and a method of depressurizing the solution.

The content of the aluminum chelate in the solution obtained by dissolving the aluminum chelate in the organic solvent is not particularly limited, may be appropriately selected depending on the intended purpose, and is preferably from 10% by mass through 80% by mass and more preferably from 10% by mass through 50% by mass.

——Deactivating Step——

The deactivating step is not particularly limited and may be appropriately selected depending on the intended purpose so long as the deactivating step is a step of imparting a reaction product of an alkoxysilane coupling agent to the surface of the porous particles. For example, it is preferable to perform the deactivating step by immersing the porous particles in a solution containing an alkoxysilane coupling agent and an organic solvent and allowing the alkoxysilane coupling agent to undergo reaction.

Judging from the structure of the porous particles, it is considered that the aluminum chelate is present not only inside the porous particles but also on the surface of the porous particles. However, during interfacial polymerization, much of the aluminum chelate on the surface is deactivated by water present in the polymerization system. Therefore, the porous particles can acquire latency without the need for the deactivating step (i.e., without having a reaction product of an alkoxysilane coupling agent on the surface thereof).

However, a thermosetting epoxy resin composition using a highly reactive alicyclic epoxy resin as an epoxy resin undergoes a significant viscosity thickening over time, if it uses a latent curing agent that has not been through the deactivating step. Judging from this, it is considered that part of the aluminum chelate on the surface of the porous particles has not been deactivated but has maintained activity.

Hence, it is preferable to deactivate the aluminum chelate present on the surface of the porous particles with an alkoxysilane coupling agent as described below.

——Alkoxysilane Coupling Agent——

The alkoxysilane coupling agent is classified into two types as described below.

The first type is a silane coupling agent of a type that reduces activity by reacting with active aluminum chelate on the surface of the porous particles to produce an aluminum chelate-silanol reaction product and thereby reducing the electron density of oxygen adjoining an aluminum atom (in other words, reducing the acidity of hydrogen bonding with oxygen, or still in other words, reducing the polarizability between oxygen and hydrogen). Examples of silane coupling agents of this type include alkoxysilane coupling agents in which an electron donating group is bonded to a silicon atom. Preferable examples of silane coupling agents of this type include alkyl alkoxysilane coupling agents containing an alkyl group. Specific examples of silane coupling agents of this type include methyl trimethoxysilane, n-propyl trimethoxysilane, and hexyl trimethoxysilane.

The second type is a silane coupling agent of a type that reduces activity by allowing active aluminum chelate on the porous particles to undergo reaction with an epoxy group in the molecule to produce an epoxy polymer chain and coat the surface with the epoxy polymer chain. Examples of silane coupling agents of this type include epoxy silane coupling agents. Specific examples of silane coupling agents of this type include 2-(3,4-epoxycyclohexyl)ethyl trimethoxysilane (KBM-303, available from Shin-Etsu Chemical Co., Ltd.) and 3-glycidoxypropyl trimethoxysilane (KBM-403, available from Shin-Etsu Chemical Co., Ltd.).

——Organic Solvent——

The organic solvent is not particularly limited, may be appropriately selected depending on the intended purpose, and is preferably a nonpolar solvent. Examples of the nonpolar solvent include a hydrocarbon-based solvent. Examples of the hydrocarbon-based solvent include toluene, xylene, and cyclohexane.

The content of the alkoxysilane coupling agent in the solution is not particularly limited, may be appropriately selected depending on the intended purpose, and is preferably from 5% by mass through 80% by mass.

The temperature of the solution in the deactivating step is not particularly limited, may be appropriately selected depending on the intended purpose, and is preferably from 10 degrees C. through 80 degrees C. and more preferably from 20 degrees C. through 60 degrees C. in terms of preventing aggregation of the porous particles and outflow of the aluminum chelate from the porous particles.

The immersion time in the deactivating step is not particularly limited, may be to appropriately selected depending on the intended purpose, and is preferably from 1 hour through 48 hours and more preferably from 5 hours through 30 hours.

In the deactivating step, it is preferable to stir the solution.

The latent curing agent obtained through the deactivating step may be filtrated, washed, and dried as needed, and subsequently pulverized to primary particles with a known pulverizer.

<Boric Acid>

The boric acid (B(OH)$_3$) has a function of cooperating with the aluminum chelate supported on the latent curing agent to initiate cationic polymerization of the epoxy resin.

The content of the boric acid in the thermosetting epoxy resin composition is not particularly limited, may be appropriately selected depending on the intended purpose, and is preferably from 1 part by mass through 500 parts by mass, more preferably from parts by mass through 400 parts by mass, and more preferably from 50 parts by mass through 300 parts by mass relative to 100 parts by mass of the latent curing agent.

It is possible to blend the boric acid during preparation of the thermosetting epoxy resin composition. However, it is preferable to blend a boric acid ester in terms of easy handleability. The boric acid ester reacts with a water content in the system and becomes boric acid. Hence, when the thermosetting epoxy resin composition is prepared by blending the boric acid ester, the boric acid is present in the thermosetting epoxy resin composition.

Examples of the boric acid ester include a compound represented by general formula (X) below.

B(OR)$_3$       General formula (X)

In general formula (X), R may the same or different and represents an alkyl group containing 1 through 6 carbon atoms. Examples of the alkyl group containing 1 through 6 carbon atoms include a methyl group, an ethyl group, a propyl group, and a butyl group.

The blending amount of the boric acid ester in the case of blending the boric acid ester in the thermosetting epoxy resin composition is not particularly limited, may be appropriately selected depending on the intended purpose, and is preferably from 1 part by mass through 500 parts by mass and more preferably from 30 parts by mass through 400 parts by mass relative to 100 parts by mass of the latent curing agent.

<Organosilane Compound>

As described in paragraphs 0007 to 0010 of JP-A No. 2002-212537, the organosilane compound has a function of working in cooperation with the aluminum chelate supported on the latent curing agent to initiate cationic polymerization of the epoxy resin. Hence, combined use of such an organosilane compound can provide an effect of promoting curing of the epoxy resin. Examples of such an organosilane compound include a highly sterically hindered silanol compound and a silane coupling agent that contains one through three lower alkoxy groups in a molecule. A silane coupling agent may contain a group having reactivity with a functional group of a thermosetting resin in a molecule, such as a vinyl group, a styryl group, an acryloyloxy group, a methacryloyloxy group, an epoxy group, an amino group, and a mercapto group. Because the latent curing agent of the present invention is a cationic curing agent, a coupling agent containing an amino group or a mercapto group may be used so long as the amino group or the mercapto group does not substantially trap cationic species generated.

Combined use of the boric acid and the organosilane compound in the thermosetting epoxy resin composition makes it possible to lower a curing start temperature (for example, an exotherm start temperature in a DSC measurement). The present inventor considers the reason for this as described below.

In the case of generation of active species from an aluminum chelate and an organosilane compound, a two-stage reaction is necessary, which may slow down the curing speed.

On the other hand, in the case of generation of active species from an aluminum chelate and boric acid, a ligand-exchange reaction occurs, which makes an unshared electron pair of the oxygen atom of a hydroxyl group of a complex produced as a result of the ligand-exchange reaction coordinate to an Al atom, to increase the acid strength of the hydrogen atom, causing an action as active species. In the case of this reaction, the generation of active species is a one-stage reaction, allowing expectation for lowering of an activating temperature. However, the absolute value of the acid strength of the active species to be generated is lower than that of Bronsted acid to be generated by an organosilane compound.

Hence, it is considered that combined use of the boric acid and the organosilane compound allows exertion of the advantages of both, making it possible to lower the curing start temperature (for example, the exotherm start temperature in a DSC measurement).

Unlike existing silane coupling agents containing a trialkoxy group, a highly sterically hindered silanol compound is an aryl silanol compound containing an aryl group.

<<Aryl Silanol Compound>>

For example, the aryl silanol compound is represented by general formula (A) below.

(Ar)$_m$Si(OH)$_n$       General formula (A)

In general formula (A), m is 2 or 3 and preferably 3, the sum of m and n is 4, and Ar is an aryl group that may contain a substituent.

The aryl silanol compound represented by general formula (A) is a monool form or a diol form.

Ar in general formula (A) is an aryl group that may contain a substituent.

Examples of the aryl group include a phenyl group, a naphthyl group (e.g., 1-naphthyl group and 2-naphthyl group), an anthracenyl group (e.g., 1-anthracenyl group, 2-anthracenyl group, 9-anthracenyl group, and benz [a]-9-anthracenyl group), a phenaryl group (e.g., 3-phenaryl group and 9-phenaryl group), a pyrenyl group (e.g., 1-pyrenyl group), an azulenyl group, a fluorenyl group, a biphenyl group (e.g., 2-biphenyl group, 3-biphenyl group, and 4-biphenyl group), a thienyl group, a furyl group, a pyrrolyl group, an imidazolyl group, and a pyridyl group. Among these aryl groups, a phenyl group is preferable in terms of ease of procurement and costs for procurement. The m number of Ar may be the same as or different from each other, but preferably are the same as each other in terms of ease of procurement.

For example, these aryl groups may contain one through three substituents.

Examples of the substituent include an electron withdrawing group and an electron donating group.

Examples of the electron withdrawing group include a halogen group (e.g., chloro group and bromo group), a trifluoromethyl group, a nitro group, a sulfo group, a carboxyl group, an alkoxycarbonyl group (e.g., methoxycarbonyl group and ethoxycarbonyl group), and a formyl group.

Examples of the electron donating group include an alkyl group (e.g., methyl group, ethyl group, and propyl group), an alkoxy group (e.g., methoxy group and ethoxy group), hydroxy group, amino group, monoalkyl amino group (e.g., monomethyl amino group), and a dialkyl amino group (e.g., dimethyl amino group).

Specific examples of a phenyl group containing a substituent include 2-methylphenyl group, 3-methylphenyl group, 4-methylphenyl group, 2,6-dimethylphenyl group, 3,5-dimethylphenyl group, 2,4-dimethylphenyl group, 2,3-dimethylphenyl group, 2,5-dimethylphenyl group, 3,4-dimethylphenyl group, 2,4,6-trimethylphenyl group, 2-ethylphenyl group, and 4-ethylphenyl group.

Use of an electron withdrawing group as a substituent makes it possible to increase the acidity of a hydroxyl group of a silanol group. Use of an electron donating group as a substituent makes it possible to decrease the acidity of a hydroxyl group of a silanol group. Therefore, with the substituent, it is possible to control the curing activity.

Here, the m number of Ar may contain different substituents, but preferably contain the same substituent in terms of ease of procurement of the m number of Ar. Moreover, some Ar may contain a substituent and the other Ar need not contain a substituent.

Among these, triphenyl silanol and diphenyl silanediol are preferable, and triphenyl silanol is particularly preferable.

<<Silane Coupling Agent>>

The silane coupling agent contains one through three lower alkoxy groups in a molecule, and may contain a group having reactivity with a functional group of a thermosetting resin in a molecule, such as a vinyl group, a styryl group, an acryloyloxy group, a methacryloyloxy group, an epoxy group, an amino group, and a mercapto group. Because the latent curing agent used in the present invention is a cationic curing agent, a coupling agent containing an amino group or a mercapto group may be used so long as the amino group or the mercapto group does not substantially trap cationic species generated.

Examples of the silane coupling agent include vinyl tris(β-methoxyethoxy)silane, vinyl triethoxysilane, vinyl trimethoxysilane, γ-styryl trimethoxysilane, γ-methacryloxypropyl trimethoxysilane, γ-acryloxypropyl trimethoxysilane, β-(3,4-epoxycyclohexyl)ethyl trimethoxysilane, γ-glycidoxypropyl trimethoxysilane, γ-glycidoxypropyl methyl diethoxysilane, N-β-(aminoethyl)-γ-aminopropyl trimethoxysilane, N-β-(aminoethyl)-γ-aminopropyl methyl dimethoxysilane, γ-aminopropyl triethoxysilane, N-phenyl-γ-aminopropyl trimethoxysilane, γ-mercaptopropyl trimethoxysilane, and γ-chloropropyl trimethoxysilane.

The content of the organosilane compound in the thermosetting epoxy resin composition is not particularly limited, may be appropriately selected depending on the intended purpose, and is preferably from 1 part by mass through 300 parts by mass and more preferably from 1 part by mass through 100 parts by mass relative to 100 parts by mass of the latent curing agent.

When the boric acid is derived from a boric acid ester during preparation of the thermosetting epoxy resin composition, the ratio by mass (organosilane compound:boric acid ester) between the blending amount of the organosilane compound and the blending amount of the boric acid ester during preparation of the thermosetting epoxy resin composition is not particularly limited, may be appropriately selected depending on the intended purpose, and is preferably from 1:3 through 3:1 and more preferably from 1:2 through 2:1.

<Other Components>

The other components are not particularly limited and may be appropriately selected depending on the intended purpose. Examples of the other components include an oxetane compound, a filler, a pigment, and an antistat.

<<Oxetane Compound>>

Combined use of the oxetane compound with the epoxy resin in the thermosetting epoxy resin composition enables a sharp exothermic peak.

Examples of the oxetane compound include 3-ethyl-3-hydroxymethyl oxetane, 1,4-bis{[(3-ethyl-3-oxetanyl)methoxy]methyl}benzene, 4,4'-bis[(3-ethyl-3-oxetanyl)methoxymethyl]biphenyl, 1,4-benzene dicarboxylic acid bis [(3-ethyl-3-oxetanyl)]methyl ester, 3-ethyl-3-(phenoxymethyl)oxetane, 3-ethyl-3-(2-ethylhexyloxymethyl)oxetane, di[1-ethyl(3-oxetanyl)] methyl ether, 3-ethyl-3-{[3-(triethoxysilyl)propoxy]methyl}oxetane, oxetanyl silsesquioxane, and phenol novolac oxetane.

The content of the oxetane compound in the thermosetting epoxy resin composition is not particularly limited, may be appropriately selected depending on the intended purpose, and is preferably from 10 parts by mass through 100 parts by mass and more preferably from 20 parts by mass through 70 parts by mass relative to 100 parts by mass of the epoxy resin.

(Method for Producing Thermosetting Epoxy Resin Composition)

A method for producing the thermosetting epoxy resin composition of the present invention includes at least a mixing step of mixing the epoxy resin, the latent curing agent, and the boric acid ester, and further includes other steps as needed.

The epoxy resin may be, for example, the epoxy resin presented as an example in the description about the thermosetting epoxy resin composition of the present invention.

The latent curing agent may be, for example, the latent curing agent presented as an example in the description about the thermosetting epoxy resin composition of the present invention.

The boric acid ester may be, for example, the boric acid ester presented as an example in the description about the thermosetting epoxy resin composition of the present invention.

The mixing method in the mixing steps is not particularly limited and may be appropriately selected depending on the intended purpose.

In the mixing step, it is preferable to further mix an organosilane compound.

The organosilane compound may be, for example, the organosilane compound presented as an example in the description about the thermosetting epoxy resin composition of the present invention.

The ratio by mass (organosilane compound:boric acid ester) between the organosilane compound and the boric acid ester in the mixing step is preferably from 1:3 through 3:1 and more preferably from 1:2 through 2:1.

The thermosetting epoxy resin composition of the present invention can be improved in low-temperature curability without adverse influence on viscosity rise during storage. Therefore, it is possible to obtain a long working life (pot life) after blending and alleviate the burden of viscosity adjustment during use.

EXAMPLES

The present invention will be described below by way of Examples. However, the present invention should not be construed as being limited to these Examples.

Production Example 1

<Production of Latent Curing Agent>
<<Porous Particle Producing Step>>
——Preparation of Water Phase——

Distilled water (800 parts by mass), a surfactant (NE-WREX R-T, available from NOF Corporation) (0.05 parts by mass), and polyvinyl alcohol as a dispersant (PVA-205, available from Kuraray Co., Ltd.) (4 parts by mass) were put in a 3 L interfacial polymerization container equipped with a thermometer and mixed uniformly, to prepare a water phase.

—Preparation of Oil Phase—

Next, a 24% by mass aluminum monoacetyl acetonate bis(ethyl acetoacetate) solution in isopropanol (ALUMI-CHELATE D, available from Kawaken Fine Chemicals Co., Ltd.) (350 parts by mass), an adduct of methylene diphenyl-4,4'-diisocyanate (3 moles) with trimethylolpropane (1 mole) (a multifunctional isocyanate compound, D-109, available from Mitsui Chemicals, Inc.) (49 parts by mass), divinyl benzene as a radical polymerizable vinyl compound (available from Merck KGaA) (21 parts by mass), and a radical polymerization initiator (PEROYL L, available from NOF Corporation) (0.21 parts by mass) were dissolved in ethyl acetate (70 parts by mass), to prepare an oil phase.

—Emulsification—

The prepared oil phase was fed into the water phase prepared beforehand, and mixed and emulsified with a homogenizer (10,000 rpm/5 minutes: T-50, available from IKA Japan K.K.), to obtain an emulsified liquid.

—Polymerization—

The prepared emulsified liquid was polymerized at 80 degrees C. for 6 hours under stirring at 200 rpm. After the reaction ended, the polymerization reaction liquid was left to cool to room temperature, and the produced polymerized resin particles were filtrated by filtration and naturally dried, to obtain a lumpy curing agent. This lumpy curing agent was pulverized to primary particles with a pulverizer (A-O JET MILL, available from Seishin Enterprise Co., Ltd.), to obtain a particulate curing agent.

—Additionally Filling Process—

The obtained particulate curing agent was fed into an impregnation liquid formed of a 24% by mass aluminum monoacetyl acetobis(ethyl acetoacetate) in isopropanol (ALUMICHELATE D, available from Kawaken Fine Chemicals Co., Ltd.) (40 parts by mass) and ethanol (60 parts by mass) and stirred at 30 degrees C. for 6 hours. Subsequently, the particulate curing agent was filtrated and naturally dried, to obtain a particulate curing agent (porous particles) to which aluminum chelate was additionally filled.

<<Deactivating Step>>

The porous particles (3 parts by mass) obtained in the porous particle producing step were fed into a solution [a solution obtained by dissolving n-propyl trimethoxysilane (KBM-3033, available from Shin-Etsu Chemical Co., Ltd.) (6 parts by mass) in cyclohexane (24 parts by mass)] (30 parts by mass), stirred at 30 degrees C. for 20 hours at 200 rpm, to deactivate the surface of the porous particles. After deactivation was completed, the porous particles were filtrated from the treating liquid by filtration and naturally dried, to obtain a latent curing agent.

Example 1

<Preparation of Thermosetting Epoxy Resin Composition>
—Materials—

Alicyclic epoxy resin (CEL2021P, available from Daicel Corporation): 100 parts by mass Triphenyl silanol (available from Tobkyo Chemical Industry Co., Ltd.): 2 parts by mass

Tributyl borate (available from Tokyo Chemical Industry Co., Ltd.): 1 part by mass Latent curing agent produced in Production example 1:1 part by mass Using the materials described above, a thermosetting epoxy resin composition was prepared according to the method described below.

Triphenyl silanol was blended in CEL2021P. Subsequently, the resultant was heated at 80 degrees C. for 4 hours, to dissolve triphenyl silanol. Then, the obtained liquid was left to cool, and the remaining materials were blended in the resultant. The resultant was stirred with AWATORI NERITARO (AR-250: available from Thinky Corporation) at 2,000 rpm for 1 minute, to obtain a thermosetting epoxy resin composition.

The structure of the alicyclic epoxy resin (CEL2021P) was as presented below.

CEL2021P

Example 2 to Example 9 and Comparative Example 1 and Comparative Example 2

<Preparation of Thermosetting Epoxy Resin Composition>

Thermosetting epoxy resin compositions were obtained in the same manner as in Example 1, except that the blending amounts of triphenyl silanol, KBM-403 (available from Shin-Etsu Chemical Co., Ltd., 3-glycidoxypropyl trimethoxysilane), and tributyl borate in Example 1 were changed to the blending amounts presented in Table 1 below.

TABLE 1

|  | Triphenyl silanol (part by mass) | KBM-403 (part by mass) | Tributyl borate (part by mass) |
|---|---|---|---|
| Comp. Ex. 1 | 3 | — | — |
| Ex. 6 | 3 | — | 1 |
| Ex. 1 | 2 | — | 1 |
| Ex. 2 | 1 | — | 2 |
| Ex. 7 | 1 | — | 3 |
| Ex. 3 | — | — | 3 |
| Comp. Ex. 2 | — | 3 | — |
| Ex. 8 | — | 3 | 1 |
| Ex. 4 | — | 2 | 1 |
| Ex. 5 | — | 1 | 2 |
| Ex. 9 | — | 1 | 3 |

Example 10

<Preparation of Thermosetting Epoxy Resin Composition>

A thermosetting epoxy resin composition was obtained in the same manner as in Example 2, except that unlike in Example 2, tributyl borate was changed to trimethyl borate.

Example 11

<Preparation of Thermosetting Epoxy Resin Composition>

A thermosetting epoxy resin composition was obtained in the same manner as in Example 2, except that unlike in Example 2, triphenyl silanol was changed to 4-TFM silanol.

4-TFM silanol stands for tris(4-trifluoromethylphenyl) silanol, and is represented by structural formula below.

4-TFM silanol can be synthesized according to, for example, a known document mentioned below.

Shuzi Hayase, Yasunobu Onishi, Shuichi Suzuki, Moriyasu Wada. Photopolymerization of Cyclohexene Oxide by Use of o-Nitrobenzyl Triphenylsilyl Ether/Aluminum Compound Catalyst. Dependence of Catalyst Activity on the Structure of the Silyl Ether. Journal of polymer Science: Part A: Polymer Chemistry 25, pp. 753-763, 1987

(DSC Measurement)

The thermosetting epoxy resin compositions obtained in Examples 1 to 11 and Comparative Examples 1 and 2 were subjected to DSC measurement.

Figure 1:
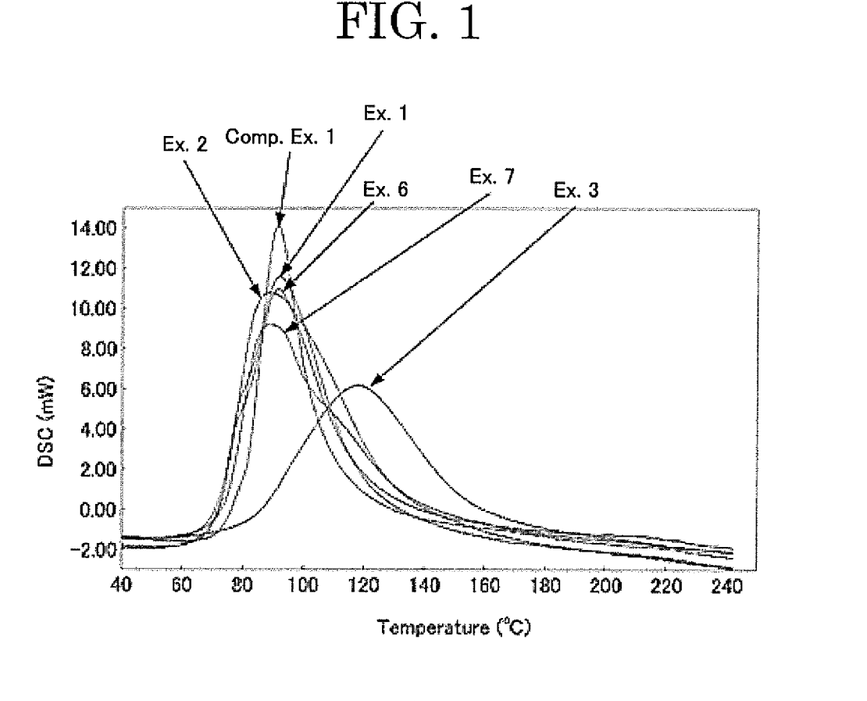
FIG. 1 plots the result of a DSC measurement.
Figure 2:
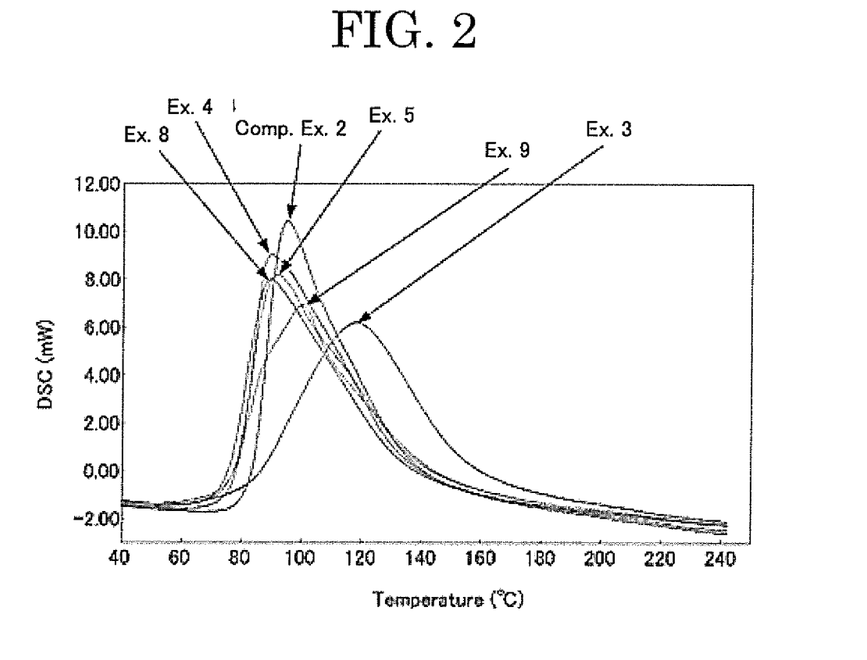
FIG. 2 plots the result of a DSC measurement.
Figure 3:
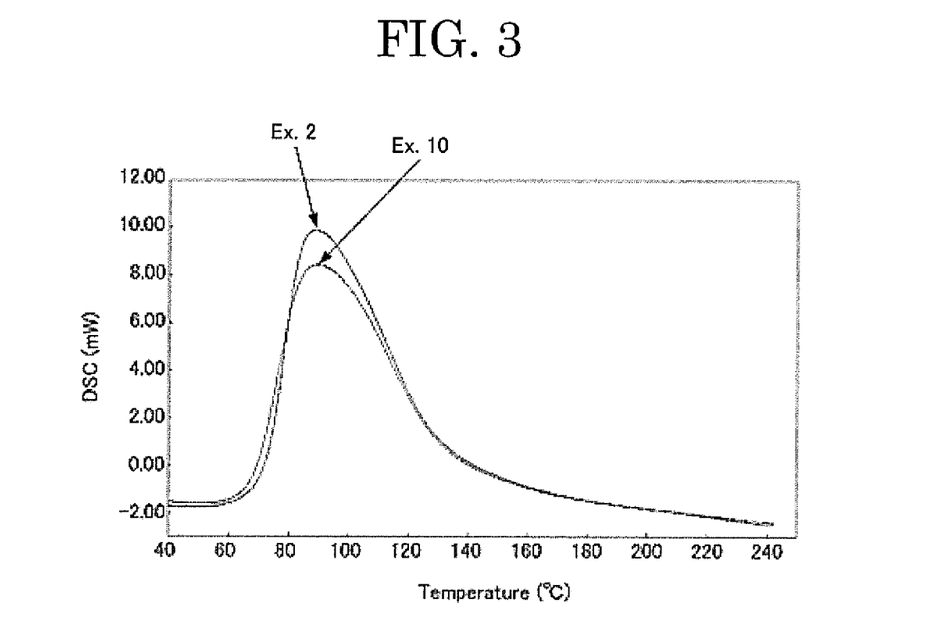
FIG. 3 plots the result of a DSC measurement.
Figure 4:
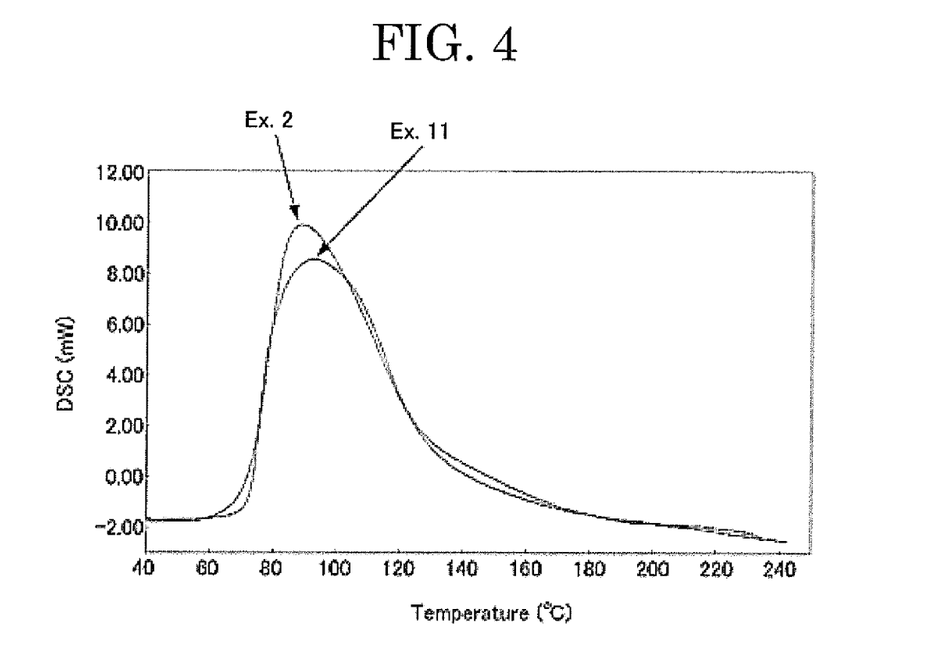
FIG. 4 plots the result of a DSC measurement.

The DSC measurement was performed under the measuring conditions below. The results are presented in Table 2 to Table 5 and FIG. 1 to FIG. 4.

—Measuring Conditions—

Measuring instrument: a differential thermal analyzer (DSC6200, available from Hitachi High-Tech Science Corporation)

Amount for evaluation: 5 mg

Temperature raising rate: 10 degrees C./1 min

TABLE 2

|  | Triphenyl silanol (part by mass) | Tributyl borate (part by mass) | Exotherm start temperature (degree C.) | Exothermic peak temperature (degree C.) | Total exothermic amount (J/g) |
|---|---|---|---|---|---|
| Comp. Ex. 1 | 3 | — | 66.0 | 92.4 | −541 |
| Ex. 6 | 3 | 1 | 62.8 | 91.5 | −521 |
| Ex. 1 | 2 | 1 | 58.7 | 92.0 | −554 |
| Ex. 2 | 1 | 2 | 55.2 | 88.9 | −562 |
| Ex. 7 | 1 | 3 | 53.4 | 88.7 | −495 |
| Ex. 3 | — | 3 | 60.5 | 118.0 | −526 |

TABLE 3

|  | KBM-403 (part by mass) | Tributyl borate (part by mass) | Exotherm start temperature (degree C.) | Exothermic peak temperature (degree C.) | Total exothermic amount (J/g) |
|---|---|---|---|---|---|
| Comp. Ex. 2 | 3 | — | 73.4 | 94.9 | −561 |
| Ex. 8 | 3 | 1 | 68.1 | 89.3 | −515 |
| Ex. 4 | 2 | 1 | 64.0 | 89.6 | −560 |
| Ex. 5 | 1 | 2 | 60.8 | 91.5 | −546 |
| Ex. 9 | 1 | 3 | 59.0 | 99.8 | −489 |
| Ex. 3 | — | 3 | 60.5 | 118.0 | −526 |

TABLE 4

| | Triphenyl silanol (part by mass) | Tributyl borate (part by mass) | Trimethyl borate (part by mass) | Exotherm start temperature (degree C.) | Exothermic peak temperature (degree C.) | Total exothermic amount (J/g) |
|---|---|---|---|---|---|---|
| Ex. 2 | 1 | 2 | — | 55.2 | 88.9 | −562 |
| Ex. 10 | 1 | — | 2 | 55.8 | 89.4 | −531 |

TABLE 5

| | Triphenyl silanol (part by mass) | 4-TFM silanol (part by mass) | Tributyl borate (part by mass) | Exotherm start temperature (degree C.) | Exothermic peak temperature (degree C.) | Total exothermic amount (J/g) |
|---|---|---|---|---|---|---|
| Ex. 2 | 1 | — | 2 | 55.2 | 88.9 | −562 |
| Ex. 11 | — | 1 | 2 | 62.5 | 92.8 | −539 |

From the DSC results, it can be understood that replacement of triphenyl silanol with a boric acid ester resulted in lowering of the exotherm start temperature. In the case of the blend of Example 2 in which the blending amount of tributyl borate was greater than the blending amount of triphenyl silanol, lowering of the exothermic peak temperature was also observed together with lowering of the exotherm start temperature. However, in the case of the blend of Example 3 in which triphenyl silanol was completely replaced with tributyl borate, shifting to higher temperatures was observed in the DSC chart. Therefore, it can be understood that a blend in which triphenyl silanol was partially replaced with tributyl borate was effective for lowering the curing start temperature.

Also in the systems using a silane coupling agent, partial replacement with a boric acid ester resulted in lowering of the exotherm start temperature. The exotherm start temperature lowered by about 9 degrees C. in Example 4, and the exotherm start temperature lowered by about 13 degrees C. in Example 5.

(Viscosity Change During Storage)

Viscosity changes of the thermosetting epoxy resin compositions of Example 2, Example 5, and Comparative Example 1 were measured.

<Measuring Method>

Viscosity measurement was performed under the measuring conditions described below. The results are presented in Table 6.

—Measuring Conditions—
Measuring instrument: SV-10 (a vibration type viscometer available from A&D Co., Ltd.)
Aging temperature: room temperature (25 degrees C.)
Viscosity measuring temperature: 20 degrees C.

In Table 6, "H" stands for "hour". That is, 1H stands for 1 hour. Therefore, for example, "1H viscosity" stands for the viscosity one hour later.

Examples 2 and 5 exhibited a good liquid life among alicyclic epoxy resins excellent in cationic polymerizability, regardless of the lowering of the DSC exotherm start temperatures (to about 55 degrees C. and about 61 degrees C.). In both Examples, the viscosity magnification after 48H of storage at room temperature was about 1.7 times relative to the initial value, and not inferior to Comparative Example 1. Particularly, when the silane coupling agent (KBM-403) was used as a curing aid, the viscosity magnification after 6H was within 5% of the initial value.

As can be understood from the above, among the aluminum chelate-organosilane compound (aryl silanol or a silane coupling agent) curing systems, the curing systems in which the organosilane compound was partially replaced with a boric acid ester succeeded in achieving a lower curing start temperature than achieved in the curing systems in which only the organosilane compound was used. Further, use of a latent curing agent surface-treated with alkyl alkoxysilane and having a high latency made it possible to prepare a thermosetting epoxy resin composition having a low-temperature activity and a good liquid life at room temperature.

INDUSTRIAL APPLICABILITY

The thermosetting epoxy resin composition of the present invention is suppressed in viscosity rise during storage and has an excellent low-temperature curability. Therefore, the thermosetting epoxy resin composition can be suitably used as an epoxy-based adhesive for low-temperature, short-time joining.

TABLE 6

| | Initial viscosity (mPa · s) | 1 H viscosity (mPa · s) | 3 H viscosity (mPa · s) | 6 H viscosity (mPa · s) | 24 H viscosity (mPa · s) | 48 H viscosity (mPa · s) | Viscosity magnification (48 H value/ initial value) |
|---|---|---|---|---|---|---|---|
| Comp. Ex. 1 | 4.71 | 4.74 | 4.83 | 4.90 | 5.05 | 5.54 | 1.2 |
| Ex. 2 | 4.16 | 4.21 | 4.69 | 4.99 | 5.98 | 7.18 | 1.7 |
| Ex. 5 | 3.65 | 3.66 | 3.66 | 3.81 | 4.75 | 6.18 | 1.7 |

The invention claimed is:

1. A thermosetting epoxy resin composition, comprising:
   an epoxy resin;
   a latent curing agent which is porous particles formed of a polyurea resin and supporting an aluminum chelate; and
   boric acid.

2. The thermosetting epoxy resin composition according to claim 1, further comprising:
   an organosilane compound.

3. The thermosetting epoxy resin composition according to claim 2,
   wherein the organosilane compound comprises at least one of an aryl silanol compound and a silane coupling agent.

4. The thermosetting epoxy resin composition according to claim 2,
   wherein the boric acid is derived from a boric acid ester during preparation of the thermosetting epoxy resin composition; and
   wherein a ratio by mass (organosilane compound:boric acid ester) between a blending amount of the organosilane compound and a blending amount of the boric acid ester during preparation of the thermosetting epoxy resin composition is from 1:3 through 3:1.

5. The thermosetting epoxy resin composition according to claim 1,
   wherein the epoxy resin comprises an alicyclic epoxy resin.

6. The thermosetting epoxy resin composition according to claim 5,
   wherein the alicyclic epoxy resin comprises at least one of compounds represented by structural formulae below, 7. The thermosetting epoxy resin composition according to claim 1,
   wherein the porous particles further comprise a vinyl resin as a constituent component.

8. The thermosetting epoxy resin composition according to claim 1,
   wherein a surface of the porous particles comprises a reaction product of an alkoxysilane coupling agent.

* * * * *